US00RE42440E

(19) United States
(12) Reissued Patent
Bera et al.

(10) Patent Number: US RE42,440 E
(45) Date of Reissued Patent: Jun. 7, 2011

(54) ROBUST MODELING

(75) Inventors: Michel Bera, Paris (FR); Erik P. Marcade, Paris (FR)

(73) Assignee: Kxen, Paris (FR)

(21) Appl. No.: 11/494,753

(22) Filed: Jul. 28, 2006

Related U.S. Patent Documents

Reissue of:
(64) Patent No.: 6,523,015
Issued: Feb. 18, 2003
Appl. No.: 09/418,537
Filed: Oct. 14, 1999

(51) Int. Cl.
*G06N 5/00* (2006.01)
(52) U.S. Cl. ..... 706/12; 706/20; 706/45
(58) Field of Classification Search ..... 706/12, 706/25, 20, 16, 45, 48
See application file for complete search history.

(56) References Cited

U.S. PATENT DOCUMENTS

| | | | | |
|---|---|---|---|---|
| 5,592,589 | A | 1/1997 | Poon | |
| 5,640,492 | A | 6/1997 | Cortes et al. | |
| 5,649,068 | A | 7/1997 | Boser et al. | |
| 5,659,667 | A * | 8/1997 | Buescher et al. | 706/23 |
| 5,684,929 | A | 11/1997 | Cortes et al. | |
| 5,720,003 | A | 2/1998 | Chiang et al. | |
| 5,745,383 | A * | 4/1998 | Barber | 705/36 R |
| 5,819,247 | A * | 10/1998 | Freund et al. | 706/25 |
| 5,987,444 | A * | 11/1999 | Lo | 706/25 |
| 6,393,413 | B1 * | 5/2002 | Jorgensen et al. | 706/20 |
| 6,714,925 | B1 * | 3/2004 | Barnhill et al. | 706/48 |
| 6,760,715 | B1 * | 7/2004 | Barnhill et al. | 706/16 |
| 7,072,841 | B1 * | 7/2006 | Pednault | 705/4 |

OTHER PUBLICATIONS

Joel Ratsaby et al., Towards Robust Model Selection Using Estimation and Approximation Error Bounds, 1996, ACM, 57-67.*
Tan, Y., et al., A Support Vector Machine with a Hybrid Kernel and Minimal Vapnik-Chervonenkis Dimension, IEEE Transactions on knowledge and Data Engineering, vol. 16., No. 4, Apr. 2004, pp. 385-395.*
Joel Ratsaby et al; Towards Robust Model Selection Using Estimation and Approximation Error Bounds; 1996; ACM; 0-89791-811-8/96/06; 57-67.
Richard P. Brent; Fast Training Algorithms for Multilayer Neural Nets; 1991; IEEE; 1045-9227/91/0500-0346; 346-354.
Vladimir Cherkassky et al; Regularization Effect of Weight Initialization in Back Propagation Networks; 1998; IEEE; 0-7803-4859-1/98; 2258-2261.
W.H. Highleyman, "The Design and Analysis of Pattern Recognition Experiments", The Bell System Technical Journal, Mar. 1962, pp. 723-744.

(Continued)

*Primary Examiner* — Wilbert L Starks, Jr.
(74) *Attorney, Agent, or Firm* — McKenna Long & Aldridge LLP

(57) ABSTRACT

A system and method are disclosed for generating a robust model of a system that selects a modeling function. The modeling function has a set of weights and the modeling function has a complexity that is determined by a complexity parameter. For each of a plurality of values of the complexity parameter an associated set of weights of the modeling function is determined such that a training error is minimized for a training data set. An error for a cross validation data set is determined for each set of weights associated with one of the plurality of values of the complexity parameter and the set of weights associated with the value of the complexity parameter is selected that best satisfies a cross validation criteria. Thus, the selected set of weights used with the modeling function provides the robust model.

2 Claims, 4 Drawing Sheets

OTHER PUBLICATIONS

I. Guyon, V. Vapnik, B. Boser, L. Bottou and S.A. Solla, "Structural Risk Minimization for Character Recognition", Advances in Neural Information Processing Systems 4, Morgan Kaufmann 1992, pp. 471-479.

I. Guyon, V. Vapnik, B. Boser, L. Bottou and S.A. Solla: Capacity control in linear classifiers for pattern recognition, Proceedings of the 11th IAPR International Conference on Pattern Recognition, Conference B: Pattern Recognition Methodology and Systems , II:385-388, IEEE, Sep. 1992.

"La Théorie Statistique de Vladimir N. Vapnik", Fiche de Référence, Conférence Nouvelles méthodes en statistiques appliquées—Application aux problèmes de prévision, May 6, 1994, Neuristique S.A., Paris.

Paul J. Werbos, "Backpropagation: Basics and New Developments", The Handbook of Brain Theory and Neural Networks, Michael Arbib editor, MIT Press, 1995, pp. 134-139.

Michael P. Perrone, "Averaging/Modular Techniques for Neural Networks", The Handbook of Brain Theory and Neural Networks, Michael Arbib editor, MIT Press, 1995, pp. 126-129.

Grace Wahba, "Generalization and Regularization in Nonlinear Learning Systems", The Handbook of Brain Theory and Neural Networks, Michael Arbib editor, MIT Press, 1995, pp. 426-430.

Vladimir N. Vapnik, "Controlling the Generalization Ability of Learning Processes", The Nature of Statistical Learning Theory, chapter 4, Springer-Verlag, New-York, 1995, pp. 89-118.

Isabelle Guyon, "A Scaling Law for the Validation-Set Training-Set Size Ratio", AT&T Bell Laboratories, 1997.

Léon Bottou, "La Mise en Oeuvre des Idées de Vladimir N. Vapnik", Statistiques et Méthodes Neuronales, chapter 16, Dunod, Paris, 1997, pp. 262-274.

* cited by examiner

ROBUST MODELING

Matter enclosed in heavy brackets [ ] appears in the original patent but forms no part of this reissue specification; matter printed in italics indicates the additions made by reissue.

FIELD OF THE INVENTION

The present invention relates generally to a learning machine that models a system. More specifically, a robust modeling system that determines an optimum complexity for a given criteria is disclosed. The robust model of a system strikes a compromise between accurately fitting outputs in a known data set and effectively predicting outputs for unknown data.

BACKGROUND OF THE INVENTION

A learning machine is a device that maps an unknown set of inputs ($X_1, X_2, \ldots X_n$) which may be referred to as an input vector to an output Y. Y may be a vector or Y may be a single value. Appropriate thresholds may be applied to Y so that the input data is classified by the output Y. When Y is a number, then the process of associating Y with an input vector is referred to as scoring and when Y is thresholded into classes, then the process of associating Y with an input vector is referred to as classification. A learning machine models the system that generates the output from the input using a mathematical model. The mathematical model is trained using a set of inputs and outputs generated by the system. Once the mathematical model is trained using the system generated data, the model may be used to predict future outputs based on given inputs.

A learning machine can be trained or using various techniques. Statistical Learning Theory by Vladmir Vapnik, published by John Wiley and Sons, ©1998, which is herein incorporated by reference for all purposes, and Advances in Kernel Methods: Support Vector Learning) published by MIT Press ©1999, which is herein incorporated by reference for all purposes describe how a linear model having a high dimensional feature space can be developed for a system that includes a large number of input parameters and an output.

One example of a system that may be modeled is electricity consumption by a household over time. The output of the system is the amount of electricity consumed by a household and the inputs may be a wide variety of data associated with empirical electricity consumption such as day of the week, month, average temperature, wind speed, household income, number of persons in the household, time of day, etc. It might be desirable to predict future electricity consumption by households given different inputs. A learning machine can be trained to predict electricity consumption for various inputs using a training data set that includes sets of input parameters (input vectors) and outputs associated with the input parameters. A model trained using available empirical data can then be used to predict future outputs from different inputs.

An important measure of the effectiveness of a trained model is its robustness. Robustness is a measure of how well the model performs on unknown data after training. As a more and more complex model is used to fit the training data set, the aggregate error produced by the model when applied to the entire training set can be lowered all the way to zero, if desired. However, as the complexity or capacity of the model increases, the error that is experienced on input data that is not included in the training set increases. That is because, as the model gets more and more complex, it becomes strongly customized to the training set. As it exactly models the vagaries of the data in the training set, the model tends to lose its ability to provide useful generalized results for data not included in the training set. FIG. 1A illustrates a model that is complex but is not robust. The output of the model is illustrated by trace 102. Trace 102 passes very close to all of the data points shown, which are included in the training set. However, because of the complex nature of curve 102, it is unlikely to successfully approximate the output Y for values of X that are not in the training set.

FIG. 1B is a graph illustrating a model that is very robust, but does not provide as good a fit as the model shown in FIG. 1A. Curve 104 does not pass as close to the data points in the training set shown as Curve 102 did in FIG. 1A. However, Curve 104 is more robust because future data points shown as circles are closer to Curve 104 than to Curve 102. In general, there is a tradeoff between providing a better and better fit for the points included in a training data set and the likelihood of a good fit for other data points not included in the training data set. The ability of the model to provide a good fit for data points not included in the training set is determined by the model's robustness. The question of how to determine an appropriately complex model so that the tradeoff between a good fit of the training set and robustness is the subject of considerable research.

For example, U.S. Pat. No. 5,684,929 (hereinafter the "'929 patent") issued to Cortes and Jackel illustrates one approach to determining an appropriate complexity for a model used to predict the output of a system. Cortes and Jackel teach that, if data is provided in a training set used to train a model and a test data set used to test the model, then an approximation of the percentage error expected for a given level of complexity using a training set of infinite size can be accurately estimated. Based on such an estimate, Cortes and Jackel teach that combining such an estimate with other estimates obtained for different levels of capacity or complexity models can be used so that the error decreases asymptotically towards some minimum error $E_m$. Cortes and Jackel then describe increasing the complexity of the modeling machine until the diminishing gains realized as the theoretical error for an infinite training set is asymptotically approached decrease below a threshold. The threshold may be adjusted to indicate when further decrease in error does not warrant increasing the complexity of the modeling function.

For very large training sets where the error on the test data set and the training data set both approximate the error on an infinite training set, this approach is useful. Generally, as complexity increases, the error decreases and it is reasonable to specify a minimum decrease in error below which it is not deemed worthwhile to further increase the complexity of the modeling function. However, the technique taught by Cortes and Jackel does not address the problem of the possible tradeoff in error for new data that results in error actually increasing as the modeling function complexity increases. By assuming that the training set is very large or perhaps infinite, if necessary, the '929 patent assumes that the error asymptotically reaches a minimum. That is not the case for finite data sets and therefore the phenomenon of reduced robustness with increased complexity should be addressed in practical systems with limited training data. What is needed is a way of varying the capacity or complexity of a modeling function and determining an optimum complexity for modeling a given system.

FIG. 2 is a graph illustrating how the error for a training data set and the error for data not included in the training set behave as the complexity of a model derived using the training data set increases. Curve 200 shows that as the complexity or capacity of the modeling function increases, the aggregate error calculated when comparing the output of the model to the output provided in the training data set for the same inputs decreases. In fact, the difference between the output of the model and the data provided in the training set can be reduced to zero if a sufficiently complex modeling function is used. Curve 202 illustrates the error determined by the difference between the output of the model and real output data obtained for inputs not included in the training set. As the complexity of the model increases, the error at first decreases until it reaches a minimum and then begins to increase. This result is caused by an overly complex model becoming excessively dependent on the vagaries of the training set. This phenomenon is referred to as over-training and results in a complex model that is a very good fit of the training data but is not robust.

Again, the tradeoff between fit and robustness as the complexity of a model increases suggests the desirability of finding an optimal level of complexity for a model so that the error of the model when applied to future input data may be minimized. However, a simple and effective method of deriving an optimally complex model has not been found. What is needed is a method of determining a model that has optimum or nearly optimum complexity so that when the best fit possible given the optimum complexity is achieved for the training set, the model tends to robustly describe the output of the system for inputs not included in the training set. Specifically, a method of varying the complexity of a model and predicting the performance of a model on future unknown inputs to the system is needed.

SUMMARY OF THE INVENTION

A robust model is generated using a technique that optimizes the complexity of the model based on data obtained from the system being modeled. Data is split into a training data set and a generalization or cross validation data set. For a given complexity, weights are determined so that the error between the model output and the training data set is minimized. A degree of complexity is found that enables weights to be determined that best minimize some measure of error between the model output or best accomplish some goal that is related to the cross validation data. The degree of complexity is measured by a complexity parameter, Lambda. Once the optimum complexity has been determined, weights for that complexity may be determined using both the training data set and the generalization data set.

In one embodiment, a polynomial function is used to model a system. The coefficients of the polynomial are determined using data in a training set with a regression method used to minimize the error between the output of the model function and the output data in the training set. A regularization coefficient is used to help calculate the weights. The regularization coefficient is also a measure of the complexity of the modeling function and may be used as a complexity parameter. By varying the complexity parameter and checking a criteria defined for comparing the output of the model and data in a cross validation set, an optimum complexity parameter may be derived for the modeling function.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method of generating a robust model of a system includes selecting a modeling function having a set of weights wherein the modeling function has a complexity that is determined by a complexity parameter. For each of a plurality of values of the complexity parameter an associated set of weights of the modeling function is determined such that a training error is minimized for a training data set. An error for a cross validation data set is determined for each set of weights associated with one of the plurality of values of the complexity parameter and the set of weights associated with the value of the complexity parameter is selected that best satisfies a cross validation criteria. Thus, the selected set of weights used with the modeling function provides the robust model.

In one embodiment, a method of generating a robust model of a system includes selecting a modeling function having a set of weights wherein the modeling function has a complexity that is determined by a complexity parameter. For each of a plurality of values of the complexity parameter, an associated set of weights of the modeling function is determined such that a training error is minimized for a training data set. A cross validation error for a cross validation data set is determined for each set of weights associated with one of the plurality of values of the complexity parameter. An optimal value of the complexity parameter is determined that minimizes the cross validation error and an output set of weights of the modeling function using the determined optimal value of the complexity parameter and an aggregate training data set that includes the training data set and the cross validation data set is determined such that an aggregate training error is minimized for the aggregate training data set. The output set of weights used with the modeling function provides the robust model.

In one embodiment, a robust modeling engine includes a memory configured to store a training data set and a cross validation data set. A processor is configured to select a modeling function having a set of weights. The modeling function has a complexity that is determined by a complexity parameter. For each of a plurality of values of the complexity parameter, the processor determines an associated set of weights of the modeling function such that a training error is minimized for a training data set. The processor determines an error for a cross validation data set for each set of weights associated with one of the plurality of values of the complexity parameter and selects the set of weights associated with the value of the complexity parameter that best satisfies a cross validation criteria. An output is configured to output the set of weights associated with the value of the complexity parameter that best satisfies a cross validation criteria.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1A:
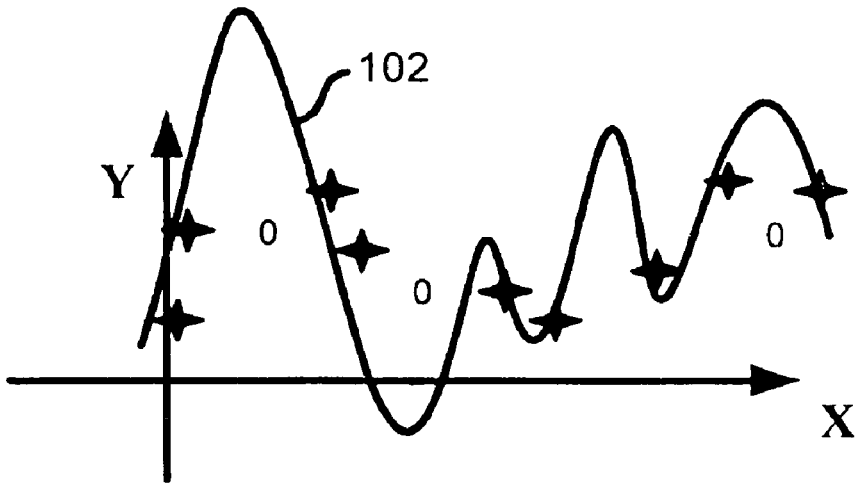
FIG. 1A illustrates a model that is complex but is not robust.
Figure 1B:
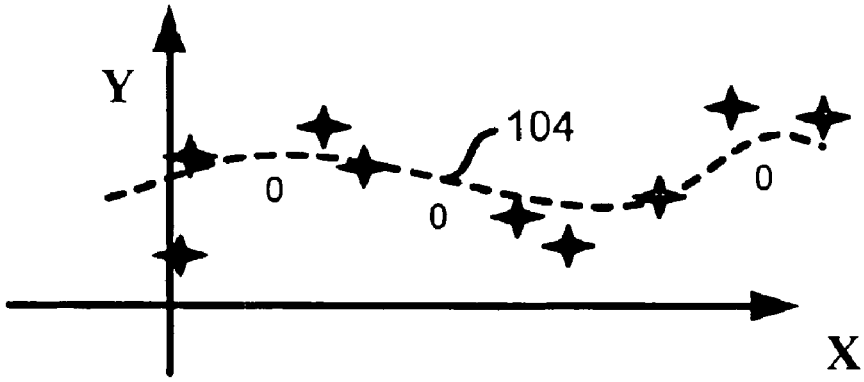
FIG. 1B is a graph illustrating a model that is very robust, but does not provide as good a fit as the model shown in FIG. 1A.
Figure 2:
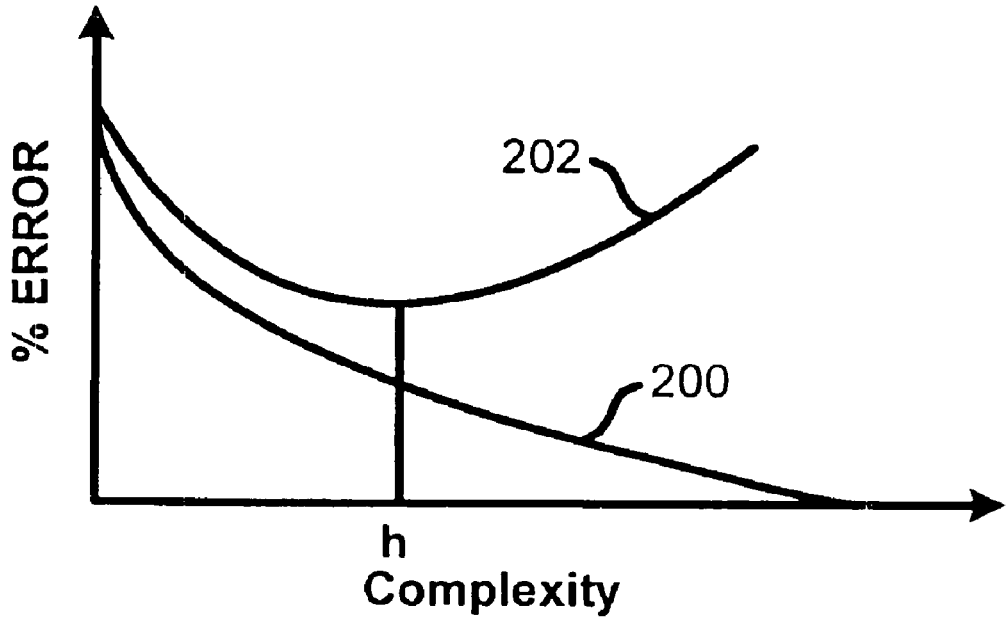
FIG. 2 is a graph illustrating bow the error for a training data set and the error for data not included in the training set behave as the complexity of a model derived using the training data set increases.

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, details relating to technical material that is known in the technical fields related to the invention has not been described in detail in order not to unnecessarily obscure the present invention in such detail.

The Regularization Function and Lambda

Using empirical data to derive an optimally robust model will now be described in detail. It should be noted that the output of such a robust model can be used in a raw form as a score, or the output can be converted to a classification using thresholds. For example, output above a certain electricity usage threshold level could be classified as high and output below that level could be classified as low. Errors in the output of the learning machine can be evaluated either in terms of the number of misclassifications or in terms of the difference between the model output and actual usage. Using raw values is referred to as scoring and using classifications is referred to as classification.

In general, a system may be described in terms of an output Y and various inputs X1,X2, . . . ,XN such that Y=F(X1, X2, . . . ,XN), where F is some unknown function of X1, X2, . . . ,XN. To model the system, the inputs are first mapped into a high dimensional feature space. Depending on the function used by the model, new attributes may be derived from the inputs. For example, various cross products and squares such as $X1^2$ or X1*X2 may be generated. For the purpose of example, an embodiment using a polynomial of degree 2 across the input attributes will be described. In other embodiments, different degree polynomials are used. Other types of functions may be used as well.

After starting with inputs X1,X2, . . . ,XN, a set of attributes can be defined. For example, using a polynomial of degree 2, the number of attributes is N such that N=n(n+3)/2+1. The attributes include all of the squares and cross products of the inputs, and a bias constant Z0. The model derived for the input data is obtained in the form Y=w0*Z0+w1*Z1+w2*Z2+ . . . +wN*ZN, where each wi is a weight that is derived for the model. In the new feature space of (Z0,Z1,Z2, . . . , ZN), the model is linear in attributes Zi. Empirical data is used to train the model and derive the weights.

One way of deriving the weights is to use the least squares method on a set of training data comprising outputs Yi and attributes (Z1i,Z2i, . . . , ZNi) derived from inputs X1i, X2i, . . . ,XNi to derive weights w that minimize the error between the model output Y'i and the empirical system outputs Yi. The least squares method is described in Numerical Recipes in C Second Edition by Press et al published by Cambridge University Press ©1997, which is herein incorporated by reference.

A model of the form described above may be the basis of a support vector machine. In support vector regression, low dimensional input data is mapped into a high dimensional feature space via a nonlinear mapping and linear regression is used in the high dimensional feature space. Linear regression in the high dimensional feature space corresponds to nonlinear regression in the low dimensional input space.

The problem of deriving the weights for a support vector machine is described in detail in Advances in Kernel Methods: Support Vector Learning, which was previously incorporated by reference. Deriving the weights w is accomplished by minimizing the sum of the empirical risk Remp(f) and a complexity term $\|w\|^2$ which determines the complexity of the model.

Remp(f) is an error term that is defined as follows:

$$\text{Remp}(f)=(\{(Yu-(\{j*Zij|j=0,\ldots,N\})^2|i=1,\ldots,L\}$$

A regularization function Rreg(f) is derived by adding a regularization coefficient to Remp(f).

Rreg(f)=Remp (f)+Lamba*$\|w\|^2$, where Lamba is a constant to be specified. This allows the error to be minimized. This mathematical technique for deriving the weights wi using a regularization coefficient is referred to as ridge regression. In the case where Remp(f)=($\{(Yi-(\{wj*Zij|j=0, \ldots, N\})^2|i=1,\ldots,L\}$, for a given Lamba, it is possible to compute the exact solution (w0, . . . , wN) by computing the partial derivatives of Remp(f) in w0, . . . , wN.

For the minimum of Remp(f), the partial derivatives are equal to zero. This yields N+1 linear equations in N+1 variables that can be solved by inverting a symmetric (N+1, N+1) matrix. A Cholevsky algorithm as is described in Numerical Recipes in C, which was previously incorporated by reference, is used in one embodiment to invert the matrix so that the weights that minimize the regularization function are determined.

Thus, a model can be described that models a system using weights that are derived by minimizing a regularization function. The regularization function includes an error term Remp (f) and a regularization coefficient. The error term shown above is derived from the polynomial least square error. Other error terms may be used. The regularization coefficient constrains the ability of the polynomial least square error to be minimized by increasing the regularization function when large weights are used.

Lambda is a nonzero term that is required to solve the above equations for w0, . . . , wN. Lambda also has an important interpretation. Referring back to Equation 1, Lambda is multiplied by the sum of the squares of the weights ω. As Lambda becomes larger the regularization term increasingly penalizes models that have large weights. Significantly, Lambda determines the complexity of the model that is derived from a given set of training data. Another way of stating this is that increasing Lambda decreases the VC dimension of the model. The VC dimension, as described in Statistical Learning Theory, which was previously incorporated by reference is a measure of the complexity of the modeling function. Thus, changing Lambda controls the complexity of the model. It should be noted that, in general, it need not be true (and in fact is not true) that the VC dimension decreases monotonically with an increase in Lambda. Rather, we say that Lambda enforces the VC dimension. That is, the VC dimension generally decreases as Lambda increases, but not necessarily in a monotonic manner.

As Lambda increases, the weights derived from a given training data set become smaller. If Lambda is infinite, the weights converge to 0 and the model reduces to a single constant, the average of the training outputs. In the terminology of support vector regression, it is said that the $\omega^2$ term enforces the flatness of the feature space and Lambda controls the flatness of the feature space. Lamba is also referred to as a regularization constant.

Example Data Set

At this point it is useful to consider an example with 2 input attributes in the original attribute space using a polynomial of degree 2 to model the system. There are 2 input attributes X1 and X2, and in the high dimensional feature space, there are 6 attributes Z0, Z1, Z2, Z3, Z4, Z5 (here, N=5).

Considering an example with 15 lines of data, the data is first divided into two sets. The first 10 lines of data are the training set and the next 5 lines are used as the cross-validation set.

| | X1 | X2 | Y |
|---|---|---|---|
| Training | 3 | 8 | 64 |
| | 1 | 6 | 8 |
| | 4 | 4 | 3 |
| | 1 | 2 | −24 |
| | 5 | 2 | −24 |
| | 9 | 4 | −12 |
| | 2 | 3 | −14 |
| | 6 | 2 | −29 |
| | 5 | 5 | 21 |
| | 2 | 5 | 6 |
| Validation | 4 | 5 | 18 |
| | 8 | 2 | −47 |
| | 9 | 4 | −12 |
| | 8 | 2 | −47 |
| | 9 | 8 | 98 |

The attributes Z1, Z2, Z3, Z4, Z5 are computed by normalizing X1 and X2, to get X1N and X2N with zero mean, and variance equals to 1. Then we compute:

Z0=1

Z1=X1N

Z2=X2N

Z3=X1N$^2$

Z4=X2N$^2$

Z5=X1N*X2N

Accordingly, the target Y is normalized to get YN.

| Z1 | Z2 | Z3 | Z4 | Z5 | YN |
|---|---|---|---|---|---|
| Training | | | | | |
| −0.70 | 1.87 | 0.49 | 3.50 | −1.31 | 1.62 |
| −1.37 | 0.90 | 1.88 | 0.81 | −1.23 | 0.19 |
| −0.36 | −0.06 | 0.13 | 0.00 | 0.02 | 0.06 |
| −1.37 | −1.03 | 1.88 | 1.06 | 1.41 | −0.63 |
| −0.02 | −1.03 | 0.00 | 1.06 | 0.02 | −0.63 |
| 1.33 | −0.06 | 1.77 | 0.00 | −0.08 | −0.32 |
| −1.03 | −0.55 | 1.06 | 0.30 | 0.57 | −0.37 |
| 0.31 | −1.03 | 0.10 | 1.06 | −0.32 | −0.76 |
| −0.02 | 0.42 | 0.00 | 0.18 | 0.01 | 0.52 |
| −1.03 | 0.42 | 1.06 | 0.18 | −0.43 | 0.14 |

-continued

| Z1 | Z2 | Z3 | Z4 | Z5 | YN |
|---|---|---|---|---|---|
| Validation | | | | | |
| −0.36 | 0.42 | 0.13 | 0.18 | 0.15 | 0.44 |
| 0.99 | −1.03 | 0.98 | 1.06 | −1.02 | −1.22 |
| 1.33 | −0.06 | 1.77 | 0.00 | −0.08 | −0.32 |
| 0.99 | −1.03 | 0.98 | 1.06 | −1.02 | −1.22 |
| 1.33 | 1.87 | 1.77 | 3.50 | 2.49 | 2.49 |

The model has the form:

$$YN=w0+w1*Z1+w2*Z2+w3*Z3+w4*Z4+w5*Z5$$

The data set is separated into a training data set and a cross validation data set. In this example, the first 10 lines of data are used for training and the last 5 lines are used for cross validation.

Using the data shown, $$\begin{aligned}
Rreg(f)=\ & \\
& (1.62-0.70*w1+1.87*w2+0.49*w3+3.50*w4-1.31*w5)\hat{}2 \\
& +(0.19-1.37*w1+0.90*w2+1.88*w3+0.81*w4-1.23*w5)\hat{}2 \\
& +(0.06-0.36*w1-0.06*w2+0.13*w3+0.00*w4+0.02*w5)\hat{}2 \\
& +(-0.63-1.37*w1-1.03*w2+1.88*w3+1.06*w4+1.41*w5)\hat{}2 \\
& +(-0.63-0.02*w1-1.03*w2+0.00*w3+1.06*w4+0.02*w5)\hat{}2 \\
& +(-0.32+1.33*w1-0.06*w2+1.77*w3+0.00*w4-0.08*w5)\hat{}2 \\
& +(-0.37-1.03*w1-0.55*w2+1.06*w3+0.30*w4+0.57*w5)\hat{}2 \\
& +(-0.76+0.31*w1-1.03*w2+0.10*w3+1.06*w4-0.32*w5)\hat{}2 \\
& +(0.52-0.02*w1+0.42*w2+0.00*w3+0.18*w4-0.01*w5)\hat{}2 \\
& +(0.14-1.03*w1+0.42*w2+1.06*w3+0.18*w4-0.43*w5)\hat{}2 \\
& +Lambda*(w0^2+w1^2+w2^2+w3^2+w4^2+w5^2)= \\
& Rreg(f)+Lambda*\|W\mu^2 \qquad \text{Equation 1}
\end{aligned}$$

For any given nonzero Lambda, e.g. from $10^{-4}$ to $10^4$, there will be a minimum for the quadratic definite positive (sum of positive terms, hence definite positive for any nonzero Lambda) for Rreg(f) in W=(w0, w1, w2, w3, w4, w5).

This gives a vector W for every Lambda and the model is expressed by:

$$YN=w0+w1*Z1+w2*Z2+w3*Z3+w4*Z4+w5*Z5$$

The remainder of the data set shown below is then used to select an optimum Lambda. The output of the model is compared to the output specified in the validation set for each input. A goal is defined for the comparison and a search is performed by varying Lambda to determine an optimum value of Lambda that best achieves the goal. Selecting an optimum Lambda is described in further detail below.

| Z1 | Z2 | Z3 | Z4 | Z5 | YN |
|---|---|---|---|---|---|
| Validation | | | | | |
| −0.36 | 0.42 | 0.13 | 0.18 | −0.15 | 0.44 |
| 0.99 | −1.03 | 0.98 | 1.06 | −1.02 | −1.22 |
| 1.33 | −0.06 | 1.77 | 0.00 | −0.08 | −0.32 |
| 0.99 | −1.03 | 0.98 | 1.06 | −1.02 | −1.22 |
| 1.33 | 1.87 | 1.77 | 3.50 | 2.49 | 2.49 |

In different embodiments, the goal can be in various forms. For example the goal can be to minimize the number of misclassifications on the verification set by the model. The goal may also be to minimize the sum of the squares of the errors. Using this goal and searching for an optimum Lambda using the Brent method, Lambda=0.1. Once the optimum Lamba is obtained, the entire data set can be used to derive w0, w1, w2, w3, w4, w5. The resulting model fits the entire data set as well as possible for the given lambda selected to maximize robustness.

Selecting an Optimum Lambda

The weights wi shown above may be derived by minimizing the regularization function for a given Lambda. Next, a technique will be described for determining an optimum value of Lambda.

Lambda is optimized using the data set aside as the cross-validation data set separate from the training data set. The cross validation set is used to determine or learn the best value of Lambda for the model. As described above, increasing Lambda in general lowers the VC dimension of the model. The best Lambda, and therefore the best VC dimension, is determined by a process of selecting different values of Lambda, deriving an optimum sets of weights for each lambda, and then evaluating the performance of the resulting model when applied to the training data set. In different embodiments, different criteria are used to evaluate the performance of the model corresponding to each Lambda.

For example, in the embodiment illustrated above, the sum of the squares of the differences between the model outputs and the cross validation data set outputs for corresponding inputs is minimized. Different values of Lambda are selected and a search is made for the Lambda that best achieves that goal. That value of Lambda is adopted as the best Lambda for the criteria selected. Minimizing the sum of the squares of the differences between the model outputs and the cross validation data set outputs is referred to as a goal or a criteria for selecting Lambda. In other embodiments, other criteria are used. For example, minimizing the absolute value of the differences between the model outputs and the cross validation data set outputs may be the goal or minimizing the maximum difference between the model outputs and the cross validation data set output may be the goal. Any criteria may be defined and a search for an optimum Lambda for maximizing or minimizing the criteria can be performed. Any suitable search method for finding an optimum Lambda may be used. In one embodiment, a Newton type minimization method is used to find the best Lambda for the given criteria. Other methods are used in other embodiments, such as the Brent method used above.

In general, as Lambda increases, the error between the model output and the training data set increases because the complexity of the model is constrained. However, the robustness of the model increases as Lambda increases. Selecting a value of Lambda by minimizing an error criteria defined for the cross validation set results in a Lambda with a good trade off between fit and robustness.

Thus, the steps for deriving a model based on a set of data described above include dividing the set of data into two sets, a training set and a cross-validation set. For a given Lambda, a best Remp(f) on the learning set is derived using the regularized least square method, with Lamba being the strength of the regularization (this is sometimes referred to as the vistamboire effect). This yields a model in the form:

$$Y=w0+w1*Z1+\ldots+wN*ZN$$

A criteria for evaluating the model is selected and the model is evaluated using the criteria and the cross-validation set. The criteria can be the sum of the squares of the errors for each sample in the cross validation data set or any other criteria that may be desired. In some embodiments, highly specialized criteria are defined based on a specific goal that may be deemed desirable for the model.

For example, in one embodiment, the goal that is defined for the purpose of optimizing Lambda is maximizing the "lift" determined by a "lift curve" for the data in the cross validation set. A lift curve is used by direct marketers to determine how effective a selection of certain members of a population has been in terms of maximizing some characteristic of the users (e.g. net sales or total customer value). The lift compares the performance of the selected group compared to the expected performance of a randomly selected group and a group selected by a "wizard" having perfect knowledge. Thus, the criteria for selecting Lambda and optimizing the robustness of the model may be very specifically adapted to a specific application of the model.

Once a criteria is selected, Lambda is optimized for the criteria. It should be noted that, for different criteria, the optimization may be either maximizing a defined parameter (such as lift) or minimizing a defined parameter (such as a type of error).

In some embodiments, once an optimal Lambda is selected, a final model is retrained using the optimum Lambda. The retraining is done by using both the training data set and the cross validation data set to determine the final set of weights ω.

Figure 3:
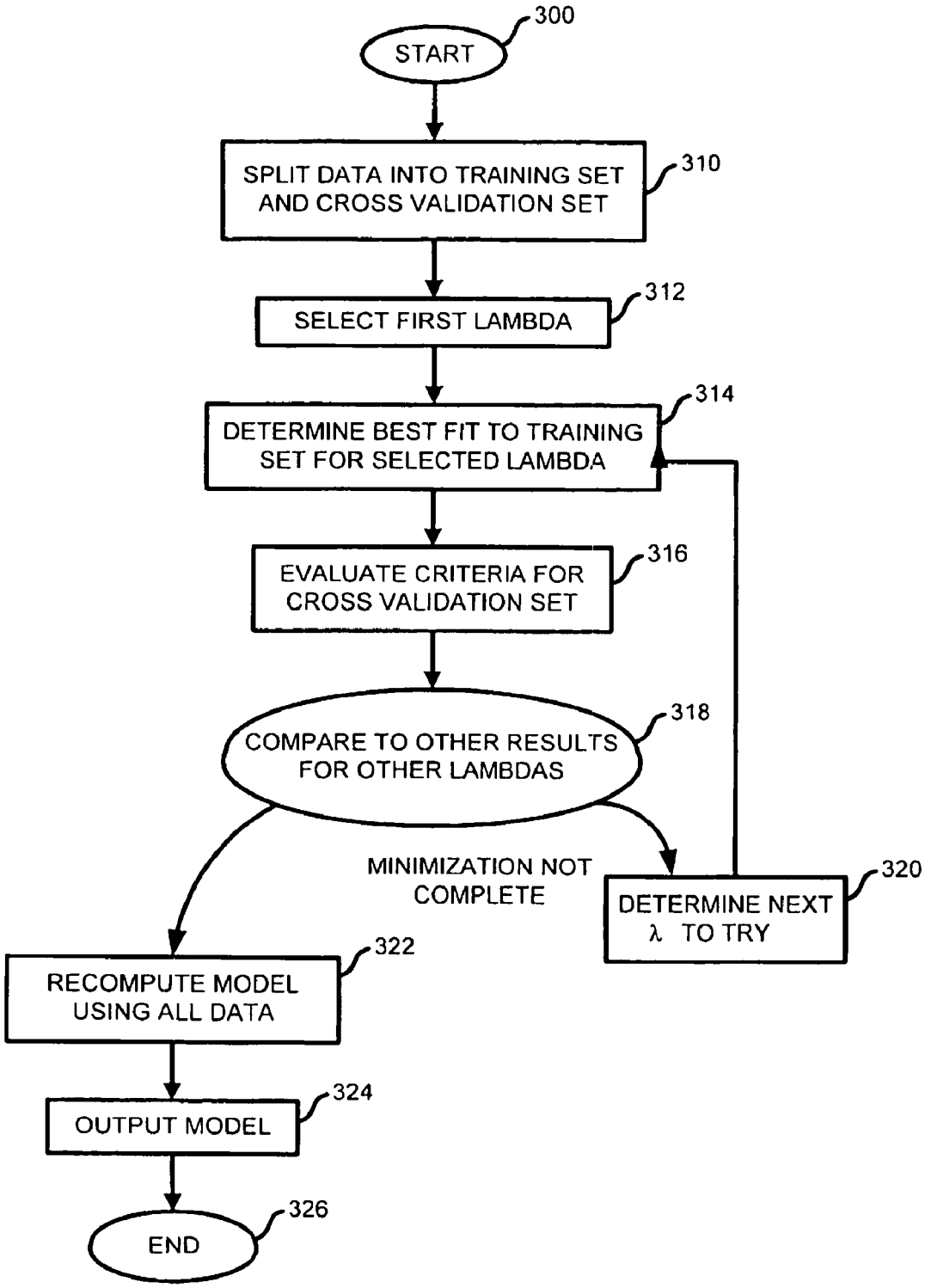
FIG. 3 is a flowchart illustrating a process for determining an optimum Lambda and outputting a model based on that optimum Lambda.

FIG. 3 is a flowchart illustrating a process for determining an optimum Lambda and outputting a model based on that optimum Lambda. The process starts at 300. In a step 310, the data is split into a training set and a cross validation set. As described above, the training set is used to determine a model with the best fit for the training set for a given Lambda. The cross validation set is used to evaluate the robustness of different models based on different Lambdas. After the data is split into the training set and the cross validation set, a search is made to determine the best Lambda.

In a step 312, a first Lambda is selected. Then, in a step 314, the best fit to the training set is found for the selected Lambda. The best fit is found using a selected type of model. As described above, one such model may be a polynomial for which determining the best fit means determining the polynomial coefficients or weights for each of the terms in the polynomial. In other embodiments, other types of modeling functions are used. As described above, Lambda for a polynomial is the regularization coefficient. In other embodiments, the Lambda is a parameter that similarly controls the complexity or VC dimension of the model. In a step 316, the best fit model determined in step 314 is evaluated according to a specified criteria using the cross validation set. The criteria specified may be a general criteria such as minimizing the error or the sum of the squared area between the output of the model and the outputs specified in the cross validation set. In other embodiments, as described above, highly specialized criteria or goals may be specified such as maximizing the lift curve for the model applied to the cross validation set.

In a step 318, the performance of the model according to the criteria is compared to other results for other Lambdas. If, as a result of the comparison, it is determined that the optimum Lambda has been found, then control is transferred to a step 322. If the optimum Lambda has not been found, then control is transferred to a step 320 where the next Lambda is determined and then control is transferred back to step 314. In different embodiments, different methods of selecting Lambdas to check and deciding when an optimum Lambda has been found are used. In general, a search is made for an optimum Lambda that satisfies the criteria and the search is complete when the search method being used determines that improvements in performance gained by selecting other Lambdas fall below some threshold. The threshold may be set in a manner that makes an acceptable tradeoff between speed and how precisely an optimum Lambda is determined.

Once the optimum Lambda is found in step 322, the model is recomputed in a similar manner as is done in step 314 using all of the data (i.e., both the data in the training set and the data in cross validation set). Next, in a step 324, the model is output. Along with outputting the coefficients or other parameters that specify the model, Lambda may also be output along with various metrics that evaluate the performance of the model. Such metrics may include measures of the error between the outputs derived from the model and the outputs specified in the data set. Performance may also be indicated by the number of misclassifications occurring for the entire data set. The process then ends at 326.

Figure 4:
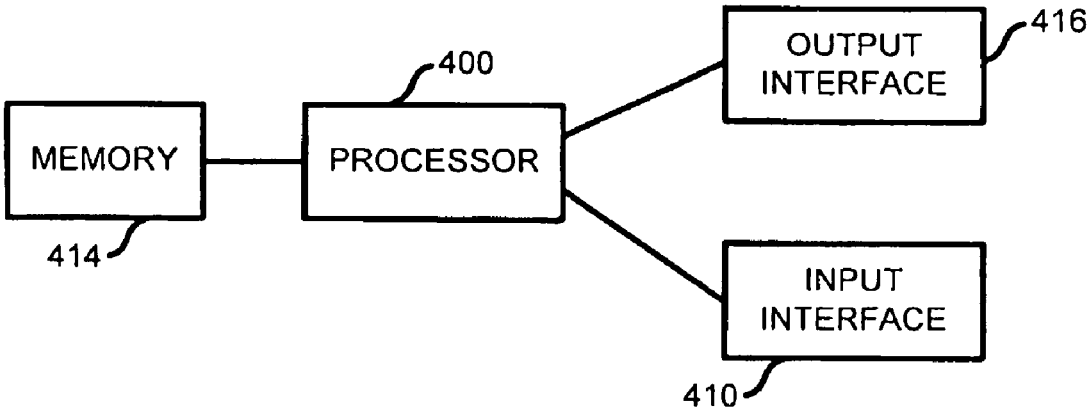
FIG. 4 is a block diagram illustrating a system used to generate a robust model as described above.

FIG. 4 is a block diagram illustrating a system used to generate a robust model as described above. A processor 400 implements the methods described above. A memory 414 stores the data set and model parameters. An input interface 410 receives input data and specifications of the type of model to be used, the type of error to be minimized when fitting the training data set, and the goal or criteria to be used to evaluate the performance of the models generated using the cross validation data set. An output interface 416 outputs the robust model, along with metrics used to evaluate the performance of the robust model.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A *computer-implemented* method of generating a robust model of a system comprising:

selecting a modeling function having a set of weights, wherein the modeling function has a complexity that is determined by a complexity parameter;

*receiving, via an input interface, model specification data of the modeling function* for each of a plurality of values of the complexity parameter[,]*;*

*retrieving a training data set from a memory;* determining an associated set of weights of the modeling function such that a training error is minimized for [a] *the* training data set;

determining an error for a cross validation data set for each set of weights associated with one of the plurality of values of the complexity parameter; and selecting the set of weights associated with a value of the complexity parameter that best satisfies a cross validation criteria[;], whereby the selected set of weights used with the modeling function provides the robust model,

*wherein the cross validation criteria comprises maximizing lift for the data in the cross validation set; and*

*outputting the set weights via an output interface.*

[2. A method of generating a robust model of a system as recited in claim 1 wherein the training error is calculated using a training error criteria that is a function of a difference between training output values associated with training input values determined from the training data set and output values determined from the modeling function and the associated set of weights applied to the training input values.]

[3. A method of generating a robust model of a system as recited in claim 1 wherein the complexity parameter affects how the training error is minimized.]

[4. A method of generating a robust model of a system as recited in claim 3 wherein the complexity parameter causes the training error to be decreased for sets of weights that are more complex.]

[5. A method of generating a robust model of a system as recited in claim 4 wherein the complexity of a modeling function having a set of weights is determined by squared weights of said set.]

[6. A method of generating a robust model of a system as recited in claim 1 wherein the complexity parameter is a regularization factor.]

[7. A method of generating a robust model of a system as recited in claim 1 wherein the complexity parameter controls an amount of noise that is added to input data of the training set.]

[8. A method of generating a robust model of a system as recited in claim 1 wherein the modeling function is a first order polynomial.]

[9. A method of generating a robust model of a system as recited in claim 1 wherein the modeling function is a second order polynomial.]

[10. A method of generating a robust model of a system as recited in claim 1 wherein the modeling function is a second order polynomial that includes cross products between input values.]

[11. A method of generating a robust model of a system as recited in claim 1 wherein the plurality of values of the complexity parameter are selected to best satisfy the cross validation criteria using a Newtonian minimization scheme.]

[12. A method of generating a robust model of a system as recited in claim 1 wherein the plurality of values of the complexity parameter are selected to best satisfy the cross validation criteria using a Brent method.]

[13. A method of generating a robust model of a system as recited in claim 1 further including separating an empirical data set into a training data set and a cross validation data set.]

[14. A method of generating a robust model of a system as recited in claim 1 wherein a threshold is applied to an output of the robust model to classify a set of inputs that generated the output of the robust model.]

[15. A method of generating a robust model of a system as recited in claim 1 wherein the training error for a training data set having input elements and output elements is defined as a sum of squared differences between said output elements and outputs of the modeling function associated with corresponding ones of said input elements.]

[16. A method of generating a robust model of a system as recited in claim 1 wherein the training error for a training data set having input elements and output elements is defined as a sum of differences between said output elements and outputs of the modeling function associated with corresponding ones of said input elements.]

[17. A method of generating a robust model of a system as recited in claim 1 wherein the training error for a training data set having input elements and output elements is defined as a maximum difference between output elements of the training data and outputs of the modeling function associated with corresponding ones of said input elements.]

[18. A method of generating a robust model of a system as recited in claim 1 further including normalizing the training data.]

[19. A method of generating a robust model of a system as recited in claim 1 further including splitting a set of data into a training data set and a cross validation training set.]

[20. A method of generating a robust model of a system as recited in claim 1 further including recalculating the set of weights using both the training data set and the cross validation data set.]

[21. A method of generating a robust model of a system as recited in claim 1 wherein the cross validation criteria is maximizing lift.]

[22. A method of generating a robust model of a system as recited in claim 1 wherein the cross validation criteria is minimizing a measure of error between the robust model and the cross validation set.]

[23. A method of generating a robust model of a system comprising:

selecting a modeling function having a set of weights wherein the modeling function has a complexity that is determined by a complexity parameter;

for a each of a plurality of values of the complexity parameter, determining an associated set of weights of the modeling function such that a training error is minimized for a training data set;

determining a cross validation error for a cross validation data set for each set of weights associated with one of the plurality of values of the complexity parameter;

determining an optimal value of the complexity parameter that minimizes the cross validation error; and determining an output set of weights of the modeling function using the optimal value of the complexity parameter and an aggregate training data set that includes a training data set and the cross validation data set such that an aggregate training error is minimized for the aggregate training data set; and whereby the output set of weights used with the modeling function provides the robust model.]

24. A robust modeling engine comprising:

a memory configured to store a training data set and a cross validation data set;

*an input interface configured to receive model specification data of a modeling function;* a processor configured to:

select a modeling function having a set of weights, wherein the modeling function has a complexity that is determined by a complexity parameter;

for each of a plurality of values of the complexity parameter, determine an associated set of weights of the modeling function such that a training error is minimized for a training data set;

determine [an error] *a quantity* for a cross validation data set for each set of weights associated with one of the plurality of values of the complexity parameter; and select the set of weights associated with the complexity parameter that best satisfies a cross validation criteria; and an output *interface* configured to output the set of weights associated with the value of the complexity parameter that best satisfies a cross validation criteria, *wherein the cross validation criteria comprises maximizing lift*.

* * * * *